US 6,328,321 B1

United States Patent
Nolan

(10) Patent No.: US 6,328,321 B1
(45) Date of Patent: Dec. 11, 2001

(54) ADJUSTABLE MOUNTING FOR SUSPENSION STRUT

(75) Inventor: Gregory James Nolan, West Pennant Hills (AU)

(73) Assignee: Noltec Distribution (AU)

(*) Notice: Subject to any disclaimer, the term of this patent is extended or adjusted under 35 U.S.C. 154(b) by 0 days.

(21) Appl. No.: 09/317,474

(22) Filed: May 24, 1999

(51) Int. Cl.$^7$ ........................................ B60G 3/00
(52) U.S. Cl. .................. 280/86.754; 280/86.75; 280/86.752; 280/86.756; 280/124.147; 280/124.155
(58) Field of Search ............... 280/124.146, 124.147, 280/124.145, 124.154, 124.155, 86.75, 86.751, 86.752, 86.754, 86.756, FOR 112, FOR 169

(56) References Cited

U.S. PATENT DOCUMENTS 4,372,575  2/1983  Hyma .
4,817,984  * 4/1989  Ferman et al. .

FOREIGN PATENT DOCUMENTS

PCT/AU92/ 00303  6/1992  (WO) .

* cited by examiner

Primary Examiner—Eric Culbreth
(74) Attorney, Agent, or Firm—Paul & Paul

(57) ABSTRACT

An adjustable mount for the upper end of a vehicle suspension strut allowing the strut to be relocated relative to a vehicle chassis member. The mount comprises a bush adapted to receive and secure the upper end of the strut, a flange extending radially outwardly from the bush, and a clamping plate adapted to abut the lower face of the flange. The flange has upper and lower faces, and the clamping plate has an opening therethrough larger than the perimeter of the bush such that the clamping plate can relatively slide over the lower face of the flange over a limited area. A plurality of studs extend upwardly from the clamping plate. The studs are located outside the periphery of the flange and restrict the sliding movement of the flange relative to the clamping plate by engagement with the periphery of the flange.

3 Claims, 7 Drawing Sheets

ADJUSTABLE MOUNTING FOR SUSPENSION STRUT

TECHNICAL FIELD

This invention relates to an adjustable mount for the upper end of a vehicle suspension strut, particularly although not limited to a mount for the upper ends of McPherson-type struts used in the front and rear suspension of motor vehicles.

BACKGROUND

Strut-type suspension is well known in motor vehicles wherein a telescope strut normally incorporating an hydraulic damper is used as one locating member for a motor vehicle wheel. The most common form of strut suspension is the so-called McPherson strut where the suspension spring is located concentrically around the telescopic strut which has an upper mounting point to the vehicle chassis in a tower located above its front wheel arch and protruding into the engine bay of the motor vehicle. The lower end of the strut is typically further located by a transverse link and a fore and aft or drag link.

The wheel alignment of a motor vehicle, particularly the front wheel alignment is important to the safe handling of the vehicle and to prevent wear on the tires. During the life of a vehicle it may be necessary or desirable to adjust the caster and/or camber of a motor vehicle wheel either due to normal wear and tear or to some form of minor damage such as the striking of curbs or other obstacles. On many motor vehicles fitted with McPherson strut suspension, this adjustment is often difficult to perform as the motor vehicle manufacturer provides little or no mechanism for relocating the upper end of the strut where it mounts into the vehicle chassis. It is often necessary to relocate the mounting point of the upper end of the strut to achieve the desired caster and/or camber settings.

It is common for the upper end of a McPherson strut to be secured to the chassis member by way of three vertical studs located on a pitch circle and passing from a flange and bush at the upper end of the strut through aligned holes in the vehicle chassis member. Some manufacturers have provided a degree of adjustment by locating the axis of the strut off-centre from the pitch circle of the studs so that disengaging the studs from the holes in the vehicle chassis member, locating the strut and re-engaging the studs through the holes will relocate the axis of the strut relative to the vehicle chassis member. This is, however, an extremely coarse adjustment which only permits the top end of the strut to be located in three defined positions. Furthermore, if it is required to alter the camber of the suspension without affecting the caster, or vice versa, this adjustment is not possible using the mounting described above.

Another type of vehicle strut type suspension with alignment adjustment is disclosed in U.S. Pat. No. 4,372,575 (Hyma). This patent discloses a mounting apparatus for attaching the upper and of the strut to a stamped sheet metal tower portion of the vehicle superstructure and having provision for adjustment of either wheel caster or wheel camber via the relative movement of the upper and of the strut relative to the towers. In this arrangement the amount of adjustable movement of the mounting apparatus is not sufficient as a series of threaded studs which project from a lower reinforcing member are restricted in movement through slots located within plate members of the mounting assembly. The size and orientation of the slots restrict the amount of possible adjustment.

International Patent Publication No. WO93/00244 (McIntyre) discloses an adjustable mount to the upper end of a vehicle suspension strut with adjustability by providing a bush adapted to receive the upper end of a strut, wherein a flange extends radially outwardly from the upper part of the bush. The flange is adapted to be slidable between the vehicle chassis member and a lower clamping plate. A plurality of studs extend upwardly through apertures within the circumference of the flange which are significantly larger than the diameter of the studs. This adjustable mount also suffers from relatively restricted adjustment because the movement of the flange is limited by the size of the apertures through which the studs extend. Whilst such an adjustable mount is able to allow for the alteration of the camber of the suspension without affecting the caster (or vice versa), there is a limitation in providing adequate, adjustability for both the camber and caster simultaneously and for providing sufficient adjustment for negative camber where it is required.

SUMMARY OF INVENTION

In one respect the present invention consists in an adjustable mount for the upper end of a vehicle suspension strut allowing the strut to be relocated relative to a vehicle chassis member, said mount comprising a bush adapted to receive and secure the upper end of the strut, a flange extending radially outwardly from the bush and having upper and lower faces, a clamping plate adapted to abut the lower face of the flange and having an opening therethrough larger than the perimeter of the bush such that the, damping plate can relatively slide over the lower face of the flange over a limited area, and a plurality of studs extending upwardly from the clamping plate, characterised in that the studs are located outside the periphery of the flange and restrict the sliding movement of the flange relative to the clamping plate by engagement with the periphery of the flange.

Preferably the flange is shaped to provide a plurality of angularly spaced apart projecting tongues.

Preferably the flange extends radially outwardly from an upper part of the bush.

Preferably each stud has an annular spacer located thereon.

In at first embodiment the flange is symmetrical about a diameter of the bush.

In a second embodiment the flange is about the bush.

BRIEF DESCRIPTION OF DRAWINGS

By way of non-limiting example, embodiments (of the above mentioned invention are described hereinafter with reference to the accompanying drawings.

MODE FOR CARRYING OUT THE INVENTION

Figure 4:
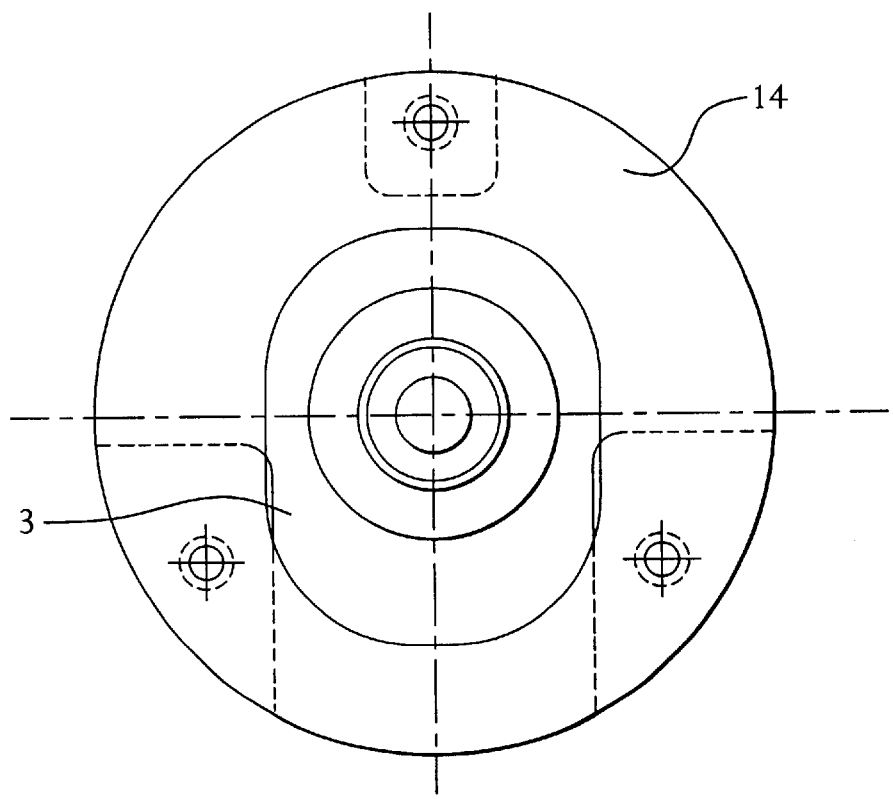
FIG. 4 is a plan view of the adjustable mount shown in FIG. 1.
Figure 3:
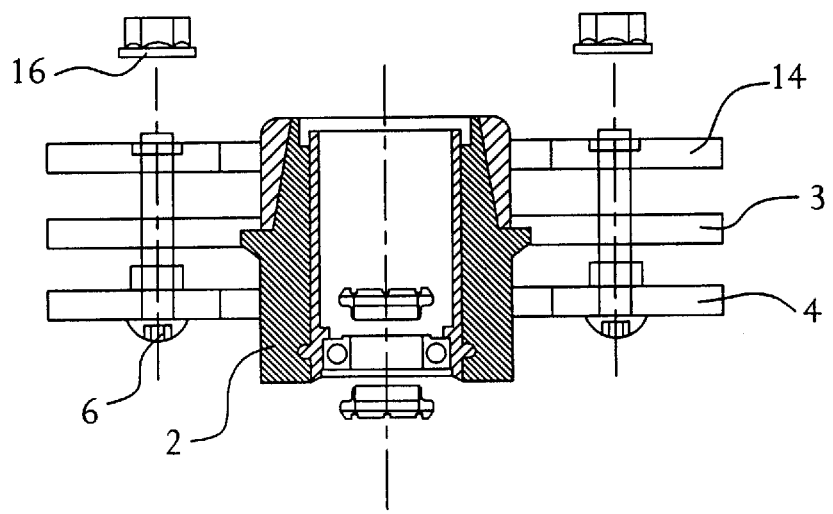
FIG. 3 is a cross-sectional elevation of the adjustable mount shown in FIG. 1, in an assembled configuration.
Figure 5A:
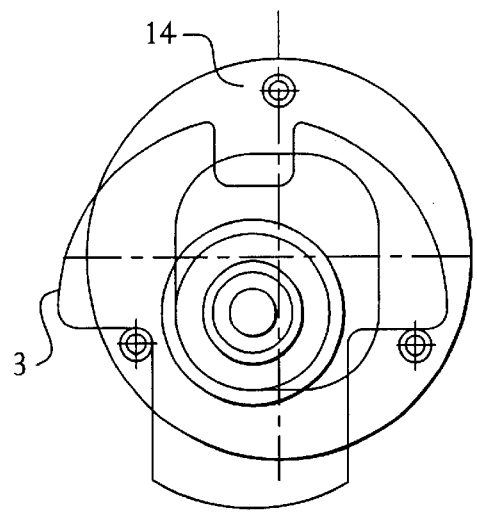
FIGS. 5(a)–5(d) show various plan views of the flange positioning relative to the face plate of the adjustable mount shown in FIG. 1.
Figure 5B:
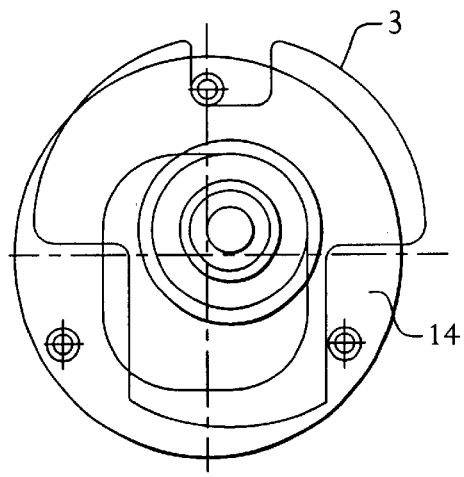
Figure 5C:
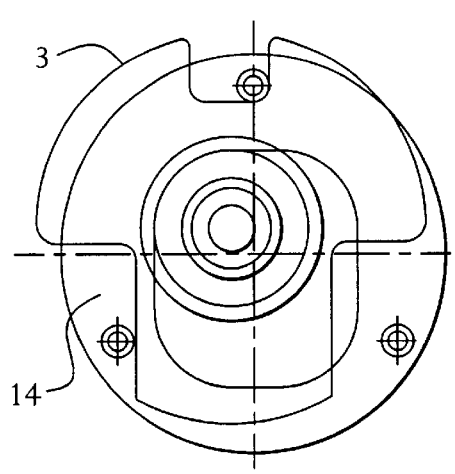
Figure 5D:
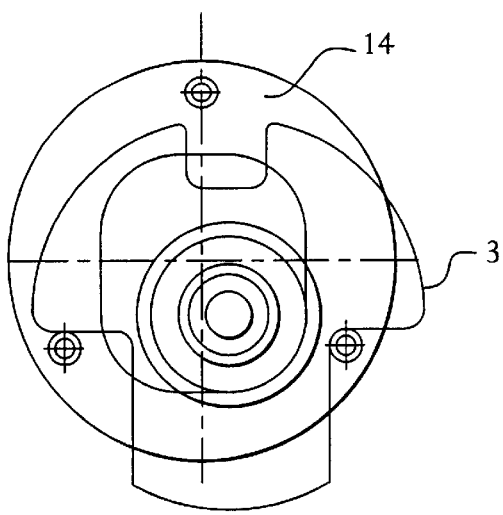

The upper end of a telescopic strut suspension member of a motor vehicle is typically secured to a chassis member which may be the top of a pressed metal tower having a hole through the centre of the tower aligned with the axis of the strut. Such prior art means of securing the strut suspension member to the vehicle is shown in FIGS. 4 and 5 of U.S. Pat. No. 5,484,161. Such prior art mount for the upper end of the strut typically comprises a circular flange from which protrudes a plurality of equally spaced studs and in which is mounted an elastomeric bush having an outer casing as part of the flange and an inner casing. The upper end of the strut is secured in the inner casing by way of a bearing hold in place by a nut engaged with a thread on the upper end of the strut.

Typically, the strut incorporates a coaxial helical spring which takes the weight of the motor vehicle.

The mount is secured to a chassis member by passing the studs through aligned holes the chassis member and securing them in place with nuts.

In the adjustable suspension mount according to a first embodiment of the invention, the prior art non-adjustable mount is replaced by an adjustable mount shown in FIGS. 1, 2, 3, 4 and 5(a) to 5(d) which permits the location of the upper end of the strut to be varied relative to the vehicle chassis member 1. The adjustable mount according to this first embodiment comprises an elastomeric bush 2 similar to the bush of the prior art mount, having a flange 3 extending radially outwardly from the upper part of the bush 2.

The mount is provided with a clamping plate 4 adapted to abut the lower face of the flange 3 and having an opening 5 therethrough larger than the perimeter of the bush 2 (in the vicinity of the clamping plate) so that the clamping plate can relatively slide over the lower face of the flange 3 over a limited area. The clamping plate 4 is further provided with threaded studs 6 extending upwardly from the clamping plate 4 and preferably equally spaced on a pitch circle.

The flange which comprises three tongues 7, 8 and 9 has a plurality of edges 10 which intersect at internal corners 11 and external corners 12.

The flange 3 is positioned between the clamping plate 4 and the face plate 14. The studs 6 which project upwardly from the clamping plate 4 are located outside of flange 3 and pass through face plate 14, so that the flange 3 is loosely sandwiched between the upper face of the clamping plate 4 and the lower face of the face plate 14. Each stud 6 has an annular spacer 13 located thereon between the clamping plate 4 and the face plate 14. Each of the spacers 13 has a length slightly smaller than the thickness of the flange 3. The spacers 13 assist in maintaining the necessary clamping pressure of the mount.

In order to retain the face plate 14 and the clamping plate 4 on the bush 2 and flange 3, retaining means may be provided to loosely secure the face plate 14 to the studs 6. The retraining means may take any suitable form but typically comprise elastomeric o-rings positioned in recesses about the stud lines immediately above the location of the face plate 14 once the clamping plate 4 and the face plate 14 have been assembled about the flange 3.

The adjustable mount is assembled into the motor vehicle by passing the studs 6 through aligned mounting holes 15 in the vehicle chassis member 1 and securing the mount to the chassis member by engaging nuts 16 with the upper ends of the studs 6.

With the nuts 16 loosely engaged on the studs 6, the flange 3 and hence the mounting bush 2 is to slide between the face plate 14 and the clamping plate 4 in any desired direction governed by the peripheral side faces 10 of the flange 3. It is therefore possible to position the upper end of the strut in the required location to achieve the desired caster and/or camber settings before tightening the nuts 16 to secure the upper end of the strut in that desired location. Four different positions of the flange relative to the clamping plate is shown in FIGS. 5(a) to 5(d).

The shape of the flange comprising the three tongues 7, 8 and 9 allows for greater adjustment of camber, and in particular negative camber, than is possible with prior art adjustable mounts. Also, improved simultaneous adjustability of caster and/or camber is achievable with the invention, than is possible with the prior art adjustable mounts. In particular, this is possible because studs 6 do not pass through the flange 3 but are located outside that periphery of the flange.

Figure 1:
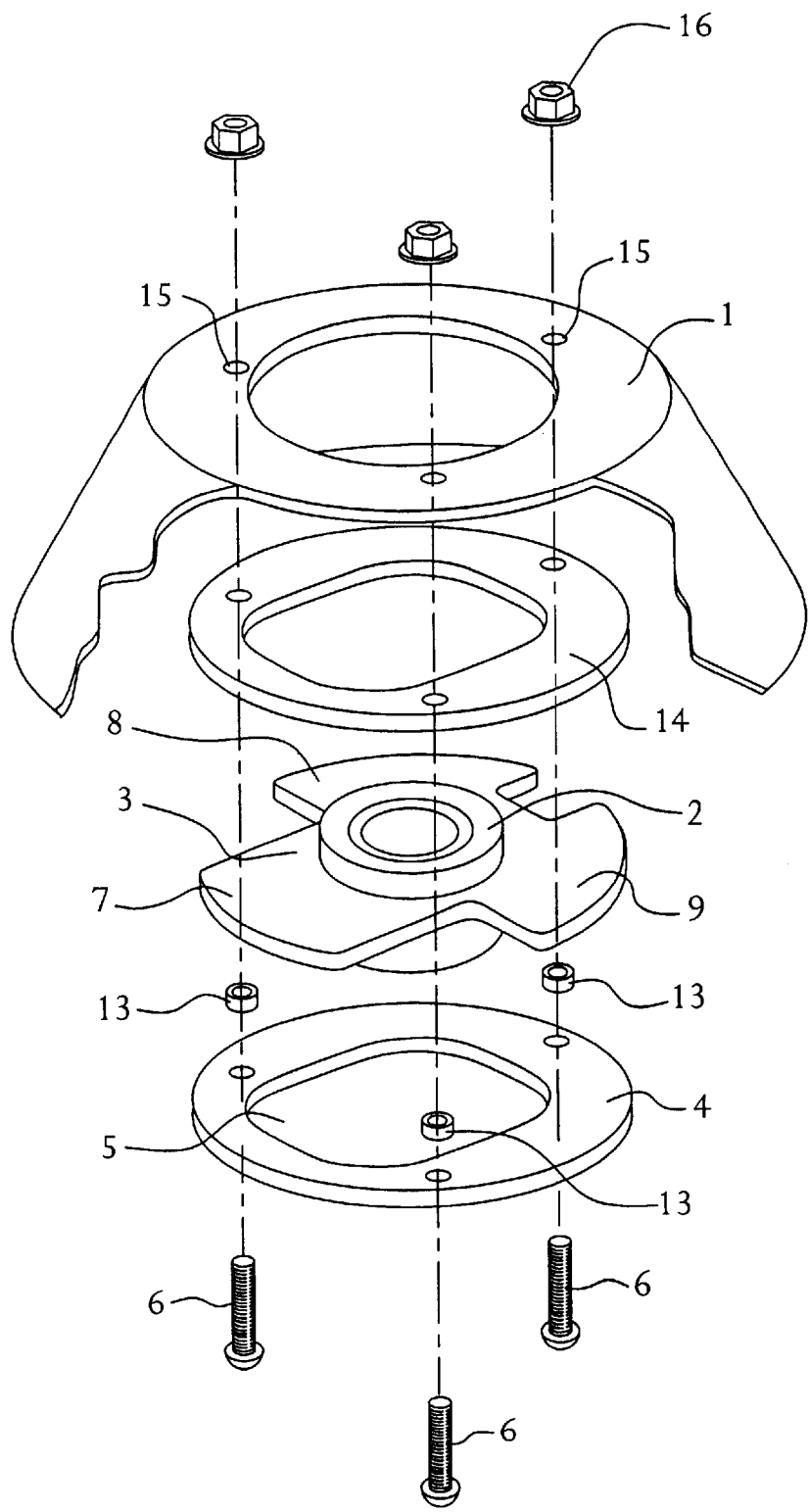
FIG. 1 is an exploded perspective view of an adjustable mount for the upper end of a vehicle suspension strut according to a first embodiment of the invention.
Figure 2:
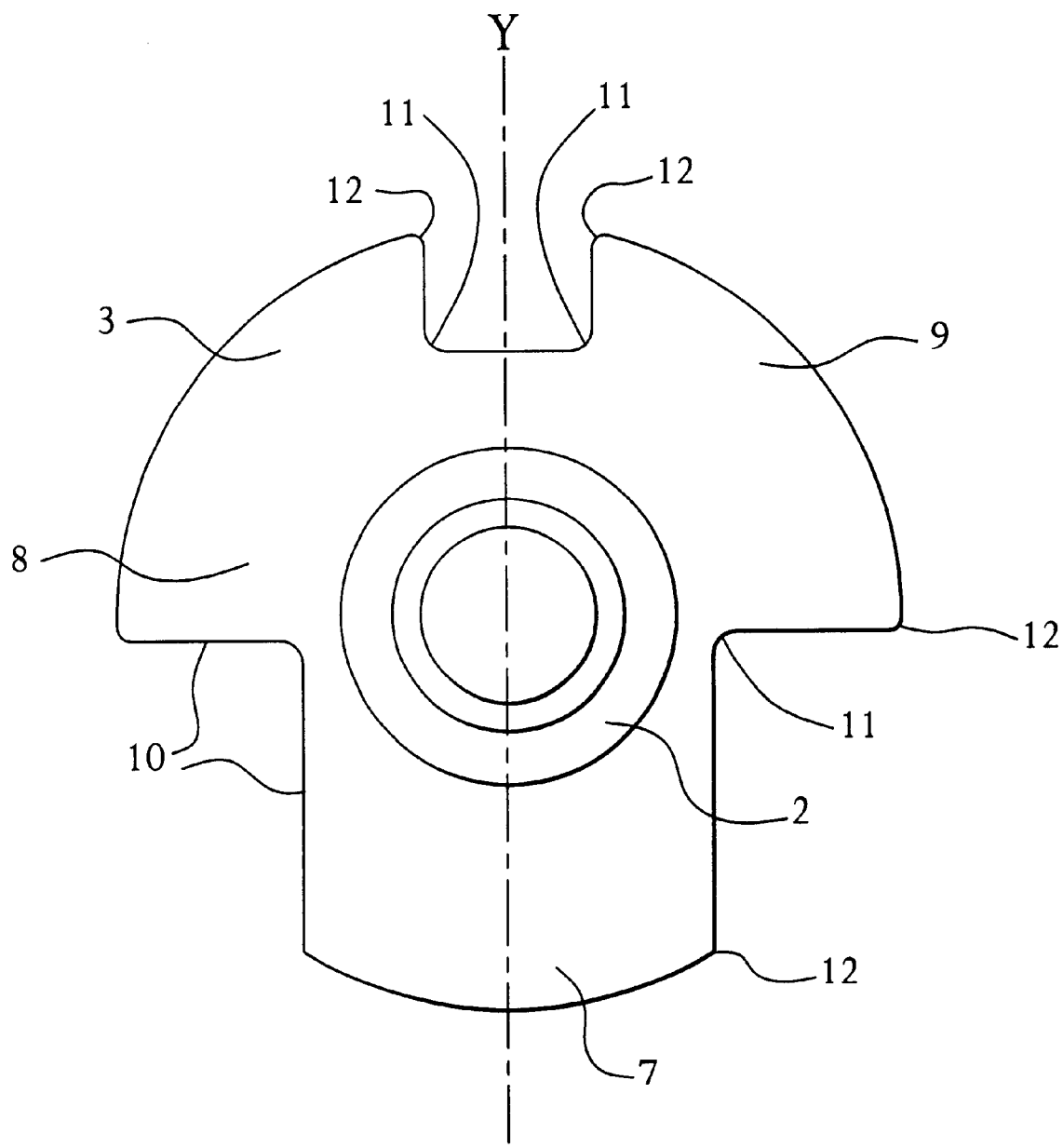
FIG. 2 is a plan view of the flange of the adjustable mount shown in FIG. 1.

As can be seen in FIG. 2 the shape of the flange about axis Y is symmetrical. This axis Y passes through a diameter of bush 2.

Figure 6:
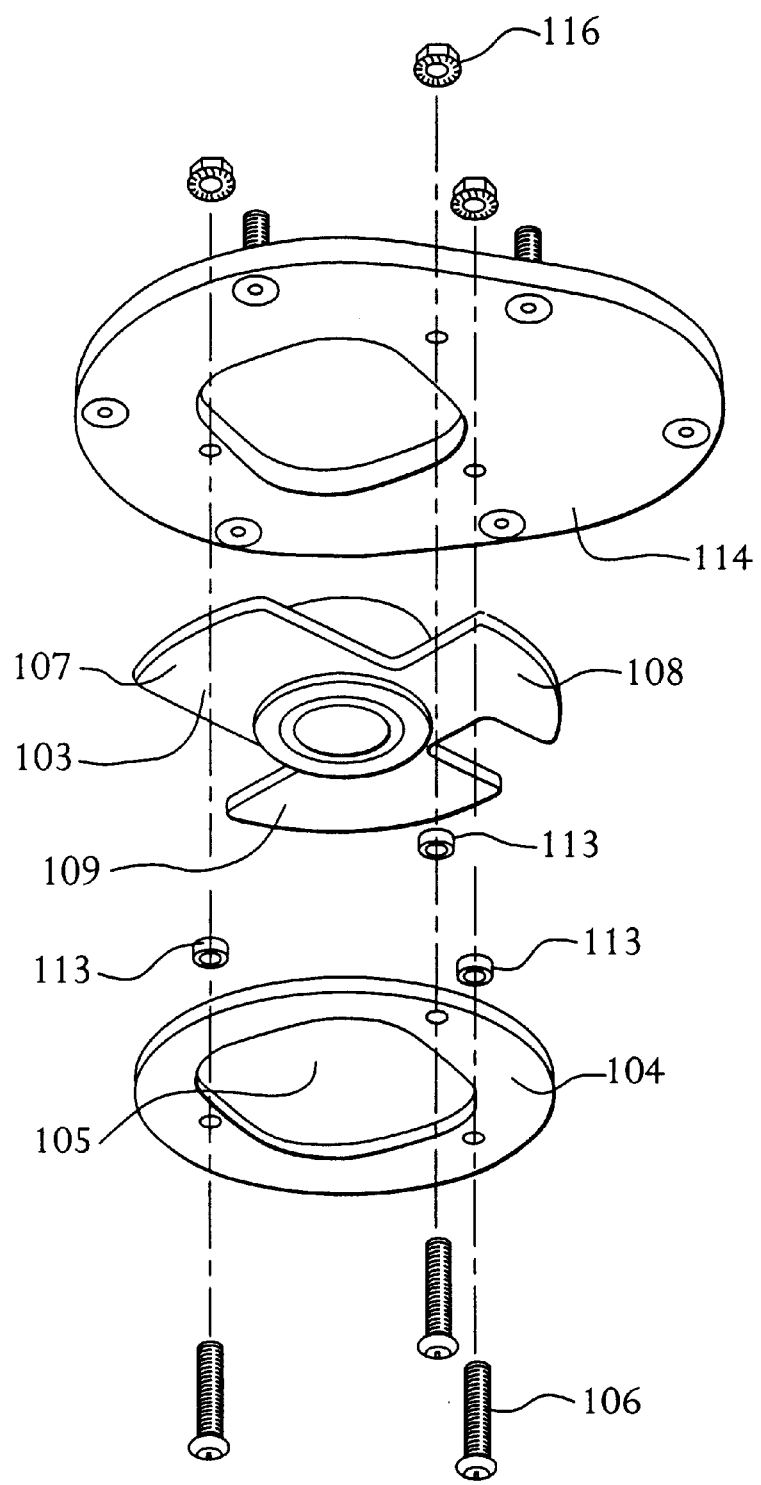
FIG. 6 shows an exploded perspective view of an adjustable mount for the upper end of the vehicle suspension strut according to a second embodiment of the invention.
Figure 7:
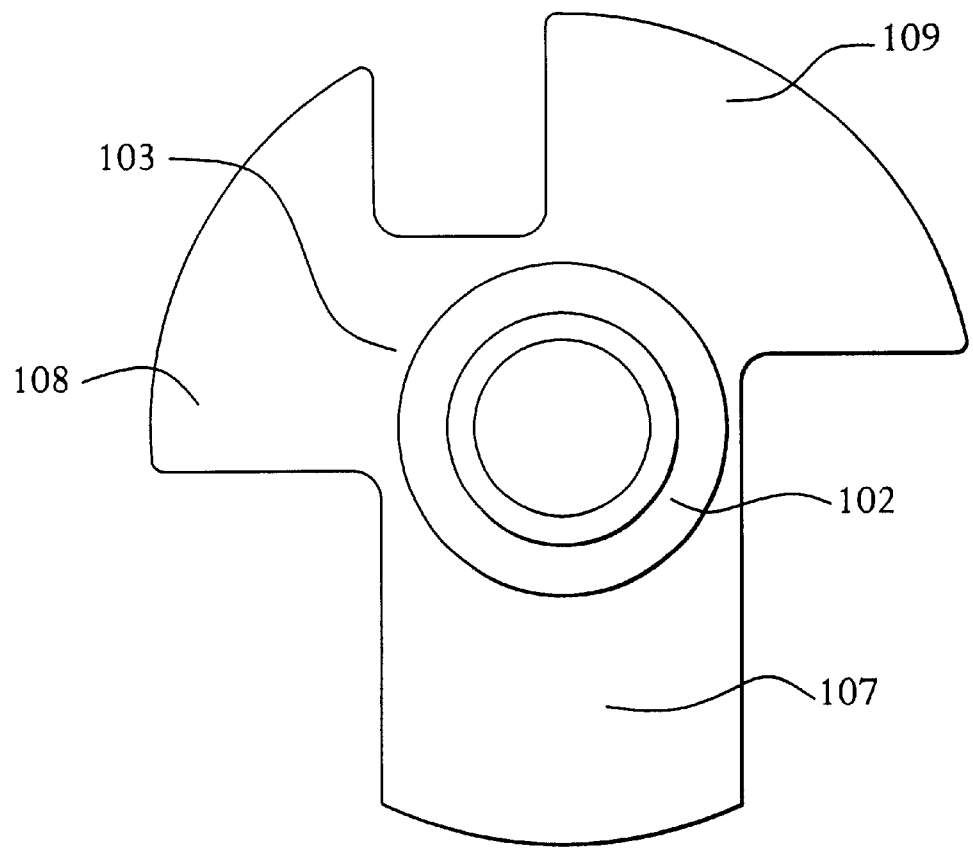
FIG. 7 is a plan view of the flange of the adjustable mount shown in FIG. 6.
Figure 8:
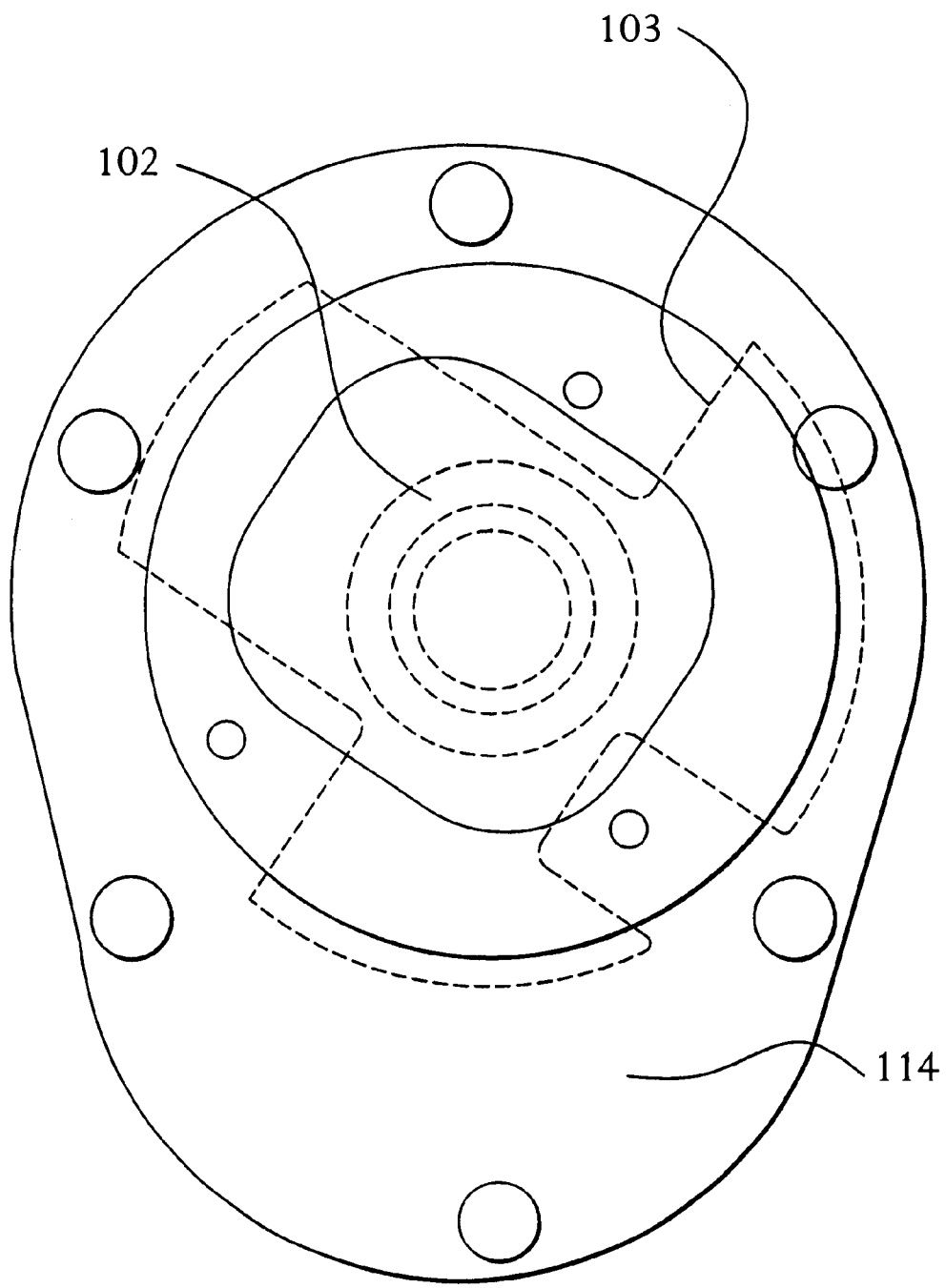
FIG. 8 shows a plan view of the top plate of the adjustable mount shown in FIG. 6. with the flange and bush shown in phantom lines.

FIGS. 6, 7 and 8 show a second embodiment of an adjustable mount in accordance with the present invention. In this second embodiment the flange 103, clamping plate 104 and face plate 114 are shaped differently to that of the mount of the first embodiment and are adapted to suit a car chassis of a different arrangement. The flange 103 comprises three tongues 107, 108, 109 and bush 102. The clamping plate 104 has an opening 105 therethrough. Each stud 106 has an annular spacer 113 located thereon between the clamping plate 4 and the face plate 14. Each of the spacers 113 has a length slightly smaller than the thickness of the flange 103. The spacers 113, as with the spacers 13 of the earlier mentioned first embodiment assist in maintaining the necessary clamping pressure of the mount.

In this embodiment toe studs 106 which extend upwardly from the clamping plate 104 and through the face plate 114, are not equally spaced about a pitch circle.

It should be readily understood that in other not shown embodiments the shape and configuration of the adjustable mount may differ without affecting the scope and spirit of the invention. For instance, in another not shown embodiment the flange may have more than three tongues and more than three studs projecting upwardly from the clamping plate.

What is claimed is:

1. An adjustable mount for the upper end of a vehicle suspension strut allowing the strut to be relocated relative to a vehicle chassis member, said mount comprising a bush having a defined perimeter, adapted to receive and secure the upper end of the strut, a flange extending radially outwardly from the bush and having upper and lower faces, a clamping plate adapted to abut the lower face of the flange and having an opening therethrough larger than the perimeter of the bush such that the clamping plate can relatively slide over the lower face of the flange over a limited area, and a plurality of studs extending upwardly from the clamping plate, characterized in that the studs are located outside the periphery of the flange and restrict the sliding movement of the flange relative to the clamping plate by engagement with the periphery of the flange wherein the flange is shaped to provide a plurality of angularly spaced apart projecting tongues.

2. An adjustable mount as claimed in claim 1, wherein the flange extends radially outward from an upper part of the bush.

3. An adjustable mount as claimed in claim 2, wherein each stud has an annular spacer located thereon.

* * * * *

UNITED STATES PATENT AND TRADEMARK OFFICE
CERTIFICATE OF CORRECTION

PATENT NO. : 6,328,321 B1 Page 1 of 1
DATED : December 11, 2001
INVENTOR(S) : Nolan It is certified that error appears in the above-identified patent and that said Letters Patent is hereby corrected as shown below:

Column 1,
Lines 57 and 60, delete "and" and replace with -- end --.
Line 61, delete "towers" and replace with -- tower --.

Column 2,
Line 16, after the word "adaquate" delete ",".
Line 31, delete "the, damping" and replace with -- the clamping --.
Line 46, after the word "is" insert -- asymmetrical --.
Line 49, delete "(".

Column 3,
Line 21, delete "hold" and replace with -- held --.
Line 28, insert -- in -- after the word "holes".

Column 4,
Line 25, delete "that" and replace with -- the --.
Line 46, delete "toe" and replace with -- the --.

Signed and Sealed this

Twentieth Day of August, 2002

Attest:

JAMES E. ROGAN
Attesting Officer  Director of the United States Patent and Trademark Office